United States Patent
Sihvola (10) Patent No.: US 7,068,685 B1
(45) Date of Patent: Jun. 27, 2006

(54) METHOD AND ARRANGEMENT FOR ENHANCING THE HANDLING OF TTI IDENTIFIER

(75) Inventor: Tuomo Sihvola, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/979,207

(22) PCT Filed: May 23, 2000

(86) PCT No.: PCT/FI00/00462

§ 371 (c)(1),
(2), (4) Date: Jan. 17, 2002

(87) PCT Pub. No.: WO00/72526

PCT Pub. Date: Nov. 30, 2000

(30) Foreign Application Priority Data

May 24, 1999 (FI) .................................. 991174

(51) Int. Cl.
*H04J 3/07* (2006.01)
(52) U.S. Cl. ................... 370/506; 370/474; 370/476
(58) Field of Classification Search ............ 370/474, 370/470, 471, 472, 475, 476, 503, 504, 505, 370/506, 507, 509, 510, 511, 512, 513, 514
See application file for complete search history.

(56) References Cited

U.S. PATENT DOCUMENTS 5,420,865 A * 5/1995 Swanbery ............... 370/506
6,061,329 A   5/2000 Abe ....................... 370/228
6,104,702 A   8/2000 Vissers .................. 370/241
6,134,233 A * 10/2000 Kay ....................... 370/350
6,442,163 B1 * 8/2002 Chopping ................ 370/395.1

FOREIGN PATENT DOCUMENTS

DE   197 22 032 A1   12/1998
EP   0 964 543 A2    12/1999
WO   WO 97/31441     8/1997

OTHER PUBLICATIONS

Lee et al., "A unique section overhead processor for STM-64"ASIC Conference and Exhibit, 1997. Proceedings., Tenth Annual IEEE International, on pp. 155-159.

* cited by examiner

*Primary Examiner*—Brian Nguyen
(74) *Attorney, Agent, or Firm*—Cohen, Pontani, Lieberman & Pavane (57) ABSTRACT

The invention relates to a method for finding frame alignment and accepting and monitoring TTI identifiers contained in frames in an SDH system. Advantageously the method according to the invention comprises steps in which frame alignment is first sought for by means of a frame alignment signal. When frame alignment has been found, it is monitored that it stays correct and at the same time at least one TTI identifier is read. According to the invention, at least one TTI identifier is saved from a frame after the finding of frame alignment. If a loss of frame alignment is detected, the TTI identifier saved is stored for a predetermined time. The invention further relates to an arrangement comprising means to implement the method described above in an SDH system.

20 Claims, 4 Drawing Sheets

| TTI byte number | VALUE | | | | | | |
|---|---|---|---|---|---|---|---|
| | b1(FAS) | b2 | b3 | b4 | b5 | b6 | b7 | b8 |
| 0 | 1 | C1 | C2 | C3 | C4 | C5 | C6 | C7 |
| 1 | 0 | x | x | x | x | x | x | x |
| . . | 0 | x | x | x | x | x | x | x |
| 15 | 0 | x | x | x | x | x | x | x |

METHOD AND ARRANGEMENT FOR ENHANCING THE HANDLING OF TTI IDENTIFIER

FIELD OF THE INVENTION

This invention relates to the handling of TTI identifier bytes in the frame structures of an SDH system.

BACKGROUND OF THE INVENTION

Conventional digital transmission networks are based on a plesiochronous digital hierarchy (PDH). A problem with plesiochronous digital networks is that it is not possible to locate in a bit stream of a higher-level system a given primary-rate signal, but the higher-level signal has to be demultiplexed through each intermediate stage down to the primary rate level. For this reason it has so far been expensive to build branching connections that need several multiplexers and demultiplexers.

The synchronous digital hierarchy (SDH) was developed in order to eliminate problems associated with the conventional digital transmission networks. The SDH facilitates the introduction of ever higher transmission rates, at the same time making the network maintenance and administration easier and more flexible than in prior-art networks. The SDH is based on the STM (Synchronous Transport Module) frame where all lower-level transmission rates are time-division multiplexed into a higher-rate frame structure. This arrangement has the advantage that the location of each signal belonging to said STM frame is known and, thereby, every individual signal in an STM frame can be extracted from the frame.

The basic structure of an SDH network is ring-like, where a ring comprises a plurality of network elements. Ring-like basic structures can be joined together by interconnecting them at a network element called a digital crossconnect (DXC). In an SDH ring, the network elements that are not interconnected with other ring networks are called add-drop multiplexers (ADM). These network elements may be assigned various tasks such as monitoring duties.

Figure 1:
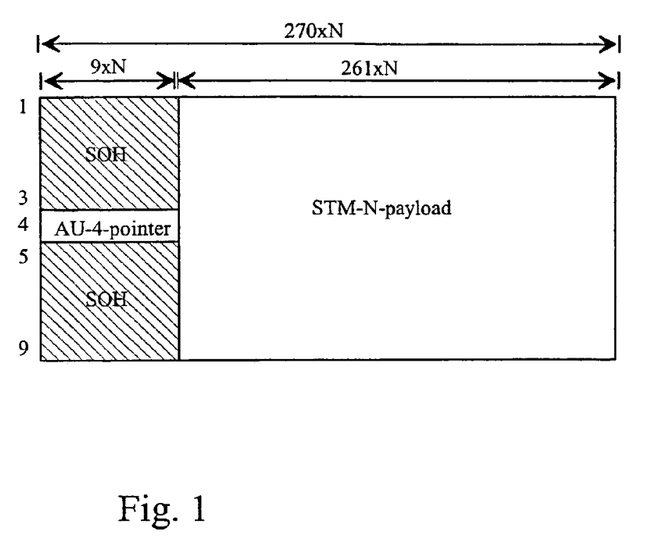
FIG. 1 shows the basic structure of the STM frame.

As was already mentioned, the synchronous digital hierarchy is based on the STM frame. The STM frame can be used at different transmission rates so that we have an STM-1, STM-4 or STM-16 frame depending on the transmission rate, or generally, an STM-N frame, where N stands for the multiple of the primary rate. FIG. 1 shows the basic structure of the STM-N frame. The STM-N frame comprises a payload and section overhead (SOH) bytes. Rows 1 to 3 and 5 to 9 in columns 1 to 9×N are reserved for the SOH bytes. Row 4 in columns 1 to 9×N is reserved for administrative unit (AU) pointers. The other columns, i.e. bytes, are reserved for the payload of the STM-N frame.

The payload can be used in many ways; for example, signals of different rates can be transported in an STM frame by dividing the payload of the STM frame into tributary units of different sizes that have address and payload information of their own. Typically, the payload of an STM-1 frame comprises 63 so-called VC-12 frames, each of which has a transmission capacity of 2048 kbit/s. The payload of each VC-12 frame typically comprises 30 or 31 channels of 64 kbit/s. Each 64 kbit/s channel typically serves one phone call. The location of every signal in the STM frame is known so that any STM frame signal can be easily either added to or removed from the STM frame.

An SDH frame comprises several different smaller units. The administrative unit is a smaller unit used for path- and section-level adaptation. It comprises a payload, or a virtual container (VC) and the aforementioned AU pointer that indicates the phase difference of the payload and the STM-N frame. One or more administrative units with a fixed position in the STM payload form an administrative unit group (AUG). The virtual container mentioned above is a multiplexing element that supports path-level connections in the SDH. A characteristic of the VC frame is that it transports untouched in the synchronous transmission network up to the destination of the container. A virtual container comprises a payload and path overhead (POH). The synchronous payload portion of the virtual container is called a container (C). A container comprises a payload signal the frequency of which may be equalized in order to synchronize it with the STM frame. A tributary unit (TU) forms a path between the higher and lower levels. It comprises a payload, or VC frame and a pointer. The pointer can be used to indicate the position of the payload in the TU frame. One or more tributary units with a fixed position in the VC frame form a tributary unit group. Said tributary unit group is formed by multiplexing the TU frames with each other.

Simply put, the compilation of an STM frame can be described as follows: First, the payload signal is inserted in the container. The container may comprise a plurality of tributary units or it may be a broadband signal. Next, the lower-level VC frame is formed by adding the overhead bytes into the container. Tributary units, or TU frames, are formed by adding the pointer bytes into the VC frames. Tributary units are multiplexed into tributary unit groups. By further multiplexing the tributary unit groups a higher-level VC frame is formed which is aligned with an AU frame which is further multiplexed into an administrative unit group. When section overhead is added to the administrative unit group, an STM frame results.

An SDH transmission network is divided into three layers: the regenerator section (RS), multiplexer section (MS), and the path (P). The aforementioned overheads are used in the management of the connections of said layers. The regenerator section lies between a line terminal and a regenerator or between two regenerators. A line terminal refers to a means with which a standard electric signal is converted into a corresponding line signal suitable for the transmission path used. A regenerator is used to amplify the signal attenuated on the transmission path. The multiplexer section lies between two multiplexers, and a path refers to an interval between points, where the frame is compiled and resolved.

Figure 2:
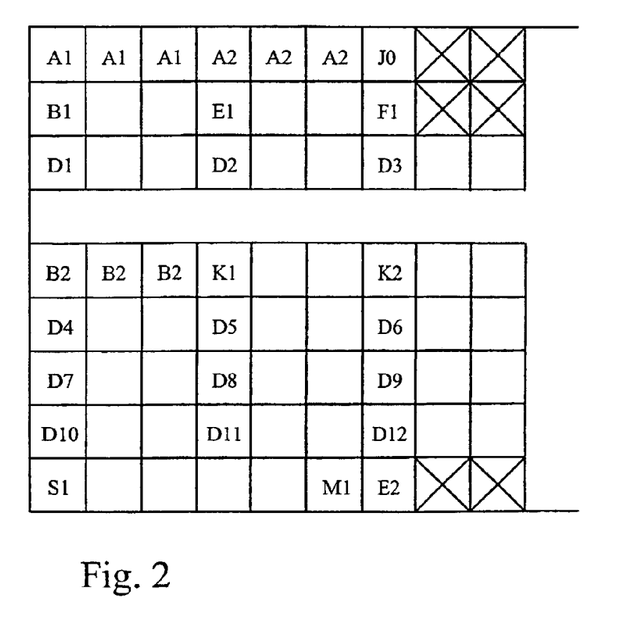
FIG. 2 shows the section overhead field of the highest-level STM frame.

An STM frame must include information indicating the network element the STM frame is directed to. At each SDH level there is a certain byte in the frame that gives the address information for that frame. The byte is located at a certain position in the frame structure of each level. The address information bytes of the different SDH levels can be called trail trace identifiers (TTI) in general. At the highest level, i.e. RS layer, the TTI in the section overhead field of the STM-1 frame is the byte J0, which is given as an example in FIG. 2. The figure shows other bytes, too, which are not discussed in this context. At the next levels S4 and S3, the TTI in the over-head field is J1. In the overhead fields of the lower levels S2 and S12 the TTI is J2.

Figure 3:
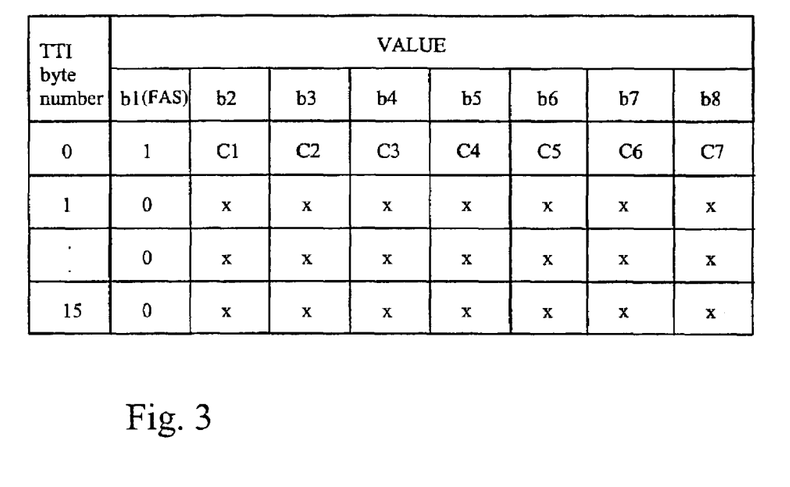
FIG. 3 shows a structure of the TTI identifier.

All TTI identifiers mentioned above advantageously comprise 16 bytes. A basic structure of said TTI identifiers is shown in FIG. 3. The first byte in the TTI is the frame start symbol. The first byte in the TTI is recognized in the sequence by setting the most significant bit to one. In the other bytes of the identifier the most significant bit is set to zero. Together the first bits of the bytes can be said to form a frame alignment signal (FAS). The other bits of the first byte in the TTI comprise an error checking code calculated using a known error checking method such as cyclic redundancy check (CRC), for example. The bits marked x in FIG. 3 constitute the actual 15×7-bit address information known as access point identifier (APId) by means of which the network elements recognize the frames addressed to it.

Figure 4:
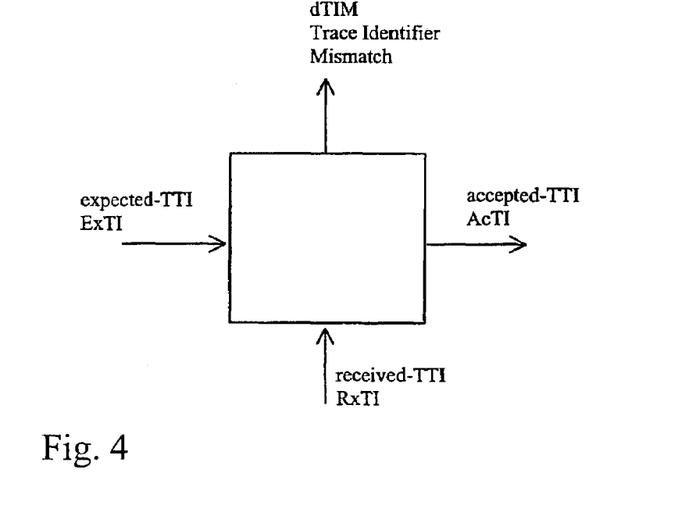
FIG. 4 shows an arrangement for utilizing the TTI identifier.

In accordance with standard ETS 300 417-1-1 the TTI identifier is utilized as shown in FIG. 4. A TTI identifier RxTI is read from the received signal and compared with the expected TTI identifier value ExTI. If the identifiers compared are identical, an accepted trail trace identifier signal, AcTI, is issued. But if the signals are not identical, a detected trace identifier mismatch signal, dTIM, is issued. In that case, an alarm indication signal, AIS, is then advantageously generated at the output.

Figure 5:
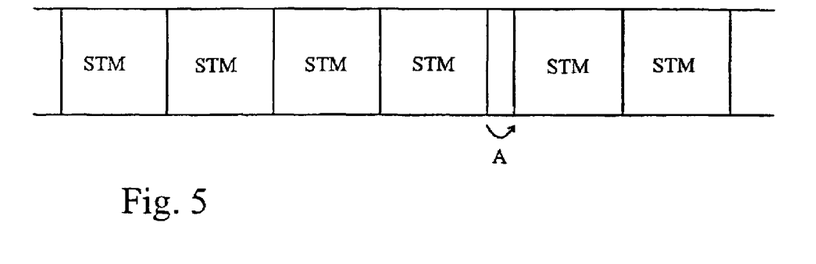
FIG. 5 shows a frame alignment shift in STM frames.

Let us next consider possible error conditions that might occur in the network. Connections are usually backed up such that a special back-up arrangement is provided for each connection, meaning that each data path has an alternative data path which will be used when a disturbance occurs on the primary data path. Then the network element that detects the disturbance switches the connection to the alternative data path. In such a case it may happen that there are various delays in the alternative data path more than in the primary data path so that the frame alignment is shifted as shown in FIG. 5. The letter A in FIG. 5 means that the frame "jumps" out of frame alignment because of the disturbance. Another disturbance might occur upon transition from a first network operator's network to a second network operator's network, say between two different countries, in which case the clock synchronizations in the two operators' networks could differ from one another. In that case the receiving network operator attempts to take the payload in buffer circuits, but in some cases the buffer capacity runs out, resulting in an overflow and frame misalignment. In these and other similar error conditions the STM frame alignment is lost, whereby a network element on the data path switches an alarm indication signal, AIS, into the signal to indicate the loss of frame alignment. When the STM frame alignment is lost, the alignments of the tributary units and VC frames will be lost, too. When these alignments are lost, the TTI information, address information APId, and the AcTI signal will be lost as well.

When frame alignment is lost, it has to be regained in order to obtain the address information from the frames. Frame alignment is sought for using said frame alignment signal, for example. When STM frame alignment is caught, VC frames can be searched for by interpreting the pointers. When the STM frame alignment is found, the TTI, i.e. byte J0, of that particular level can be found. The frame alignment having been found, the AU-4 pointers in the administrative unit are interpreted in order to find the VC-4 frame which further reveals the TTI identifier J1. After that it is possible to find the lower-level tributary unit TU which further reveals the lower-level VC frames. When the lower-level VC frames are found, the TTI identifiers J2 can be found, too. When all the TTI identifiers have been found, said access point identifier, APId, can be checked. If the TTI identifiers prove correct, the TTI identifier information can be accepted by issuing the accepted trail trace identifier signal AcTI.

Loss of frame alignment e.g. from reasons mentioned above and the regaining of frame alignment may take a long time. The more time is consumed the more frames and, hence, data are lost. For example, the loss and regaining of frame alignment plus the time without frame alignment may add up to some tens of milliseconds at the STM frame level. During this time many frames, each lasting 125 μs, will be lost and, thereby, a lot of data. During said time when frame alignment is lost, alarm indication signal AIS is advantageously added to the signal. Time consumed in the loss and regaining of frame alignment is multiplied when going to the lower levels.

SUMMARY OF THE INVENTION

An object of this invention is to provide a method and an arrangement for minimizing signal breaks caused by TTI checks resulting from the loss of STM frames.

The objects of the invention are achieved by dividing the TTI acceptance phase into two parts by means of which frame alignment can be found and the TTI identifier accepted. As an error occurs, i.e. frame alignment is lost in one part according to the invention, the TTI information can be kept for a certain time while a first state machine is attempting to regain the frame alignment. By means of this arrangement it is possible to avoid a break in the signal transmitted. In accordance with the invention, a memory element is advantageously used in the handling and storing of TTI identifiers.

A method according to the invention for finding frame alignment and accepting and monitoring TTI identifiers in frames in an SDH system is characterized in that it comprises steps in which frame alignment is sought for by means of a frame alignment signal, when frame alignment is found, it is monitored that the frame alignment stays correct, when frame alignment is found, at least one TTI identifier is read, at least one TTI identifier from a frame, advantageously from the first frame, is saved after the finding of frame alignment, and if loss of frame alignment is detected, the TTI identifier saved is kept for a predetermined time.

An arrangement according to the invention for finding frame alignment and accepting and monitoring address information contained in frames in an SDH system is characterized in that it comprises means for searching for frame alignment by means of a frame alignment signal, means for supervising the correctness of the frame alignment found, means for reading at least one TTI identifier from the frames, means for saving a TTI identifier from a frame, advantageously from the first frame, after the finding of frame alignment, and means for storing TTI information for a predetermined time when frame alignment is lost.

Further advantageous embodiments of the invention are specified in the dependent claims.

In the arrangement according to the invention, a frame alignment signal is sought in the TTI identifiers received. When the frame alignment signal has been found for a sufficient number of times, frame alignment can be considered found. Subsequent to the finding of frame alignment, the 16 eight-bit bytes that form the TTI identifier proper are checked; these bytes comprise the address information indicating the network element the data is intended for. When the same TTI bytes have been found in successive frames a sufficient number of times, the address information is accepted, whereafter the payload proper is read or the frames in question are sent forward. If the frame alignment in the frames coming into the network element is changed, an unnecessary loss of address information contained in the TTI is prevented according to the invention by keeping the information of an accepted TTI for a predetermined time and using the address in the TTI for the transmission of frames for that period of time during which frame alignment is lost.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention is below described with reference to the accompanying drawings in which.

Like elements in the drawings are denoted by like reference designators.

DETAILED DESCRIPTION OF THE PRESENTLY PREFERRED EMBODIMENTS

According to the invention the handling of the TTI identifier can be divided into at least two different processes. The first of these processes involves the finding of frame alignment by means of the TTI identifier. In this explanatory embodiment, a frame alignment signal is sought from the most significant bits of the TTI bytes, which frame alignment signal could be a bit pattern '1000 0000 0000 0000', for example. When the frame alignment signal has been found, advantageously a sufficient number of times, the second process for handling the TTI identifier, i.e. the TTI byte acceptance process, becomes executable. In the TTI acceptance process it is checked how well the bytes 0 to 15 in the TTI identifier shown in FIG. 3 match each other in successive frames, whereby, if a sufficient number of TTI bytes 0 to 15 match each other, it is possible to verify that the address information in those STM frames is correct. After the verification, the frames can be transported from the network element's buffer circuit to the data-reading elements in the network element.

If frame alignment is lost, the TTI acceptance process is prevented. According to the invention, the TTI identifier value is not, however, completely lost, but it is kept in storage. If frame alignment is not regained in a predetermined time, an alarm indication signal (AIS) is generated at the output. The acceptance process is continued from a point which depends on the point where the frame alignment was lost.

Advantageously, various signaling mechanisms are arranged for the handling of the TTI to indicate things associated with the handling of frames. One useful mechanism is to use certain bits in the data stream, i.e. flags, to indicate various hardware states. Such flags may include e.g. the LOTF and LOTT, the former indicating loss of frame alignment and the latter indicating loss of TTI acceptance phase. In addition, there may be various counters by means of which it is possible to advantageously ignore random changes in the most significant bits of the TTI bytes. Advantageously the counters are arranged so as to have a pre-set limit value on the basis of which it is possible to detect whether a real change has occurred in the frame alignment signal, for instance, or is the bit change random only. When the random changes in bit values are ignored, it is possible to prevent an unnecessary search for frame alignment from starting.

Figure 6:
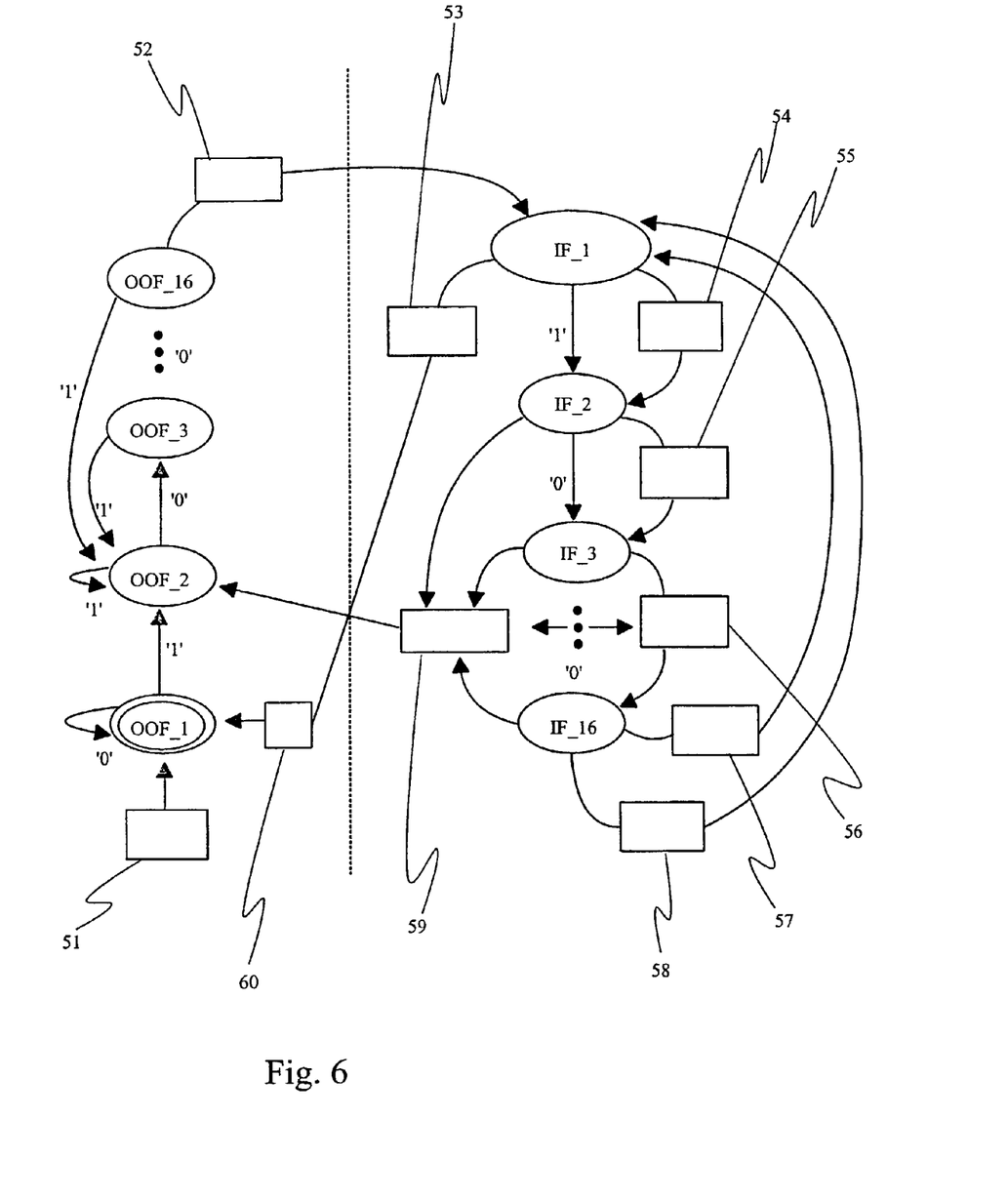
FIG. 6 shows a first state machine for handling the TTI identifier.

In accordance with the description given above, the handling of the TTI can be divided into two parts and these parts can be represented by state machines. FIG. 6 shows a state machine for searching for frame alignment. Let us first consider the left side of the figure where frame alignment is searched for. When searching for frame alignment, a frame alignment signal FAS is looked for, i.e. a bit pattern formed by the most significant bits of the TTI identifier, which bit pattern in this exemplary embodiment is '1000 0000 0000 0000'. Initially, the aforementioned LOTF flag is set 51 high to indicate that frame alignment has not been found. Let us first consider a situation in which the bit examined in the first state OOF__1 is '1'. The process moves on to state OOF__2 in which it is checked that the next bit is '0'. This is repeated till state OOF__16 if all bits examined have been zeroes in accordance with the frame alignment signal. If in the first state OOF__1 the bit examined is '0', the process stays in that state and waits until the bit examined is '1' and only then moves on to state two. If in state two, i.e. OOF__2, the bit examined is '1', the process stays in state OOF__2 and looks for a bit value '0' and only then moves on. When the bit examined in states OOF__3 to OOF__16 is '1', the process in this exemplary embodiment returns to state OOF__2 and looks for a bit the value of which is '0'. It is obvious to a man skilled in the art that if the value of the bit examined in states OOF__2 to OOF__16 is '1', the process may according to another arrangement return to state OOF__1 where it looks for a bit the value of which is '1'.

Let us next consider the right side of FIG. 6 where it is monitored that frame alignment holds. The LOTF bit is set 52 to zero to indicate that frame alignment has been found. In this exemplary embodiment there is further a so-called Wrong flag to indicate that there is a portion, such as a bit, in the frame alignment signal that does not belong to the correct frame alignment signal. A Faulty counter is used to determine how many erroneous bits are allowed in the frame alignment signal before frame alignment is considered lost. If the predetermined limit value of the Faulty counter is exceeded, the frame in question is filtered out of the data signal. In the first state IF__1 of the right side of FIG. 6 it is first checked the most significant bit in the first TTI byte. If the bit matches the value of the most significant bit of the first byte in the frame alignment signal the process moves on to state IF__2. But if the most significant bit of the first byte does not match the corresponding bit in the correct frame alignment signal, it is checked whether the counter value is large enough that frame alignment can be considered lost. If this is the case 53, the process moves on to state OOF__1 on the left side of FIG. 6 to search for frame alignment again. Additionally in this exemplary embodiment the LOTF flag is set to indicate 60 that frame alignment is lost. But if it is detected, in accordance with the counter value, that the bit error is random, the Wrong flag is set 54 and the process moves on to state IF__2. Operation 55, 56 is similar in states IF_2 to IF_15 with, however, the exception that if the counter value equals the predetermined limit value and frame alignment is lost 59, the process moves on to state OOF_2 on the left side of the figure. In state IF_16 on the right side of the figure the operation is such that if the bit examined differs from the corresponding bit pattern of the correct frame alignment signal and the value of the Faulty counter equals the predetermined limit value 59, the process moves on to state OOF_2 on the left side of the figure in accordance with the above and the LOTF flag is set. If the limit value of the Faulty counter has not been reached but the Wrong flag has been set in some previous state OOF_1 to OOF_15 or the value of the bit examined in state OOF_16 is '1', the Faulty counter is incremented by one, the Wrong flag is reset 58, and the process continues from state IF_1 with the next frame. Furthermore, the finding of frame alignment can be indicated to the TTI acceptance process e.g. using a signal, such as FRAME_START signal. If, on the other hand, the bit examined conforms to the correct frame alignment signal and the Wrong flag has not been set 57, the Faulty counter is reset and the process continues from state IF_1 and the FRAME_START signal, for instance, is set. It is obvious to a man skilled in the art that the Wrong flag can be used advantageously to indicate that the frame alignment signal examined differs in at least one bit from the correct frame alignment signal, whereby the Faulty counter can be incremented by one. Such an arrangement can be advantageously used to set a limit to the number of consecutive frames in which the frame alignment signal bit pattern may differ from the correct frame alignment signal bit pattern. According to an advantageous embodiment the value of the limit is based on error probabilities of data traffic.

When frame alignment has been found, advantageously a sufficient number of times, the TTI identifier acceptance process may be started. In the acceptance process, an address in the TTI identifier is read that identifies the network element the frame or frames are intended to. In accordance with the invention, each TTI identifier byte is saved after the frame alignment signal has been found. After the saving, the bytes of the TTI in the next frame are in this exemplary embodiment matched against the corresponding saved bytes one by one to find out whether the TTI identifier has been erroneously changed. Advantageously, the bytes of TTI identifiers in several frames are matched against the corresponding saved bytes to make sure that the address information in the TTI identifier is correct. If the bytes of the TTI identifiers in the different frames match the saved bytes in a sufficient number of successive frames and with sufficient accuracy, the address in question can be accepted and the data in the frames can be read. When the address information in the frames has been accepted, it is monitored that the TTI bytes remain unchanged. Advantageously, random errors are taken into account in the implementation of the monitoring so that up to a certain limit random errors are ignored.

Figure 7:
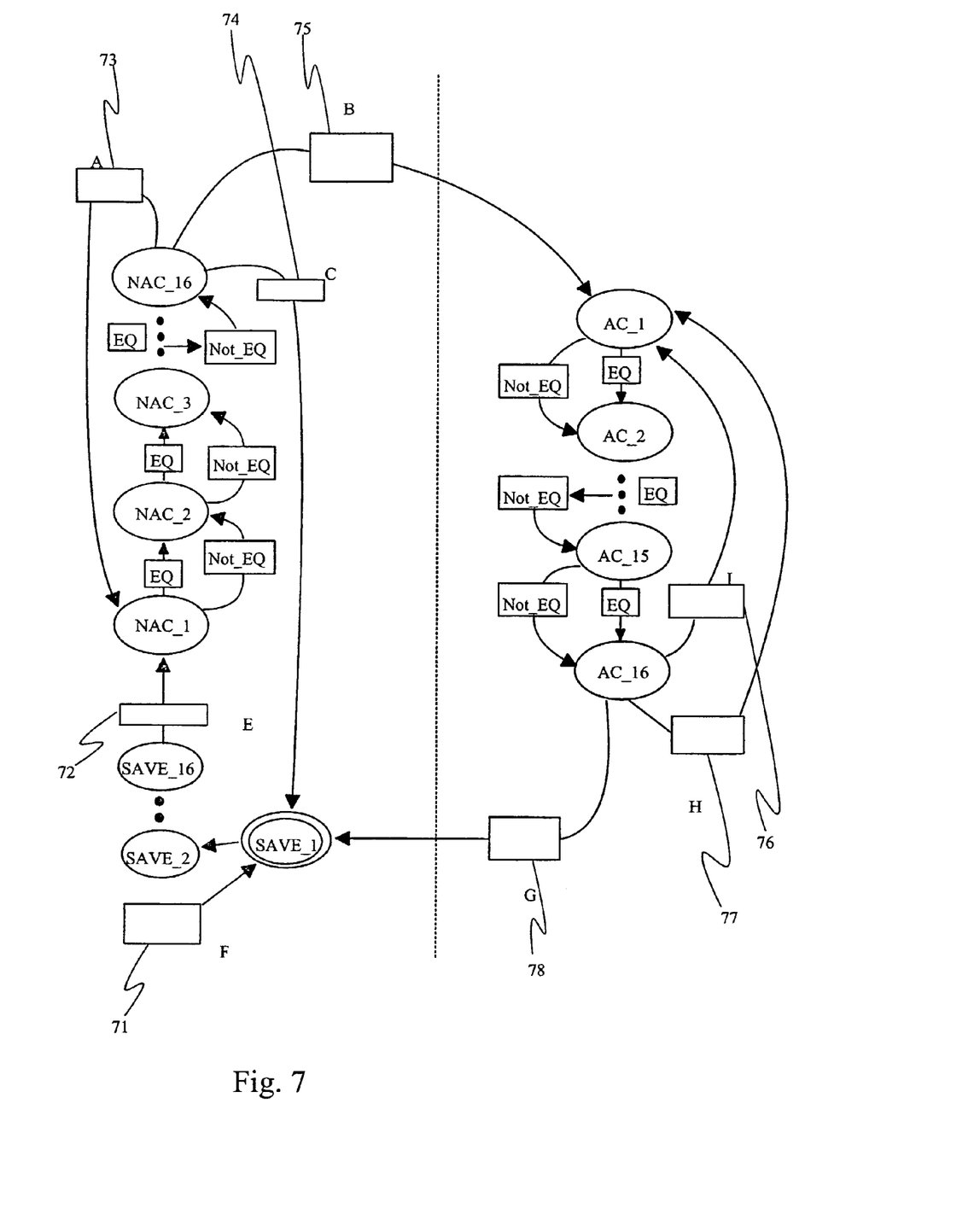
FIG. 7 shows a second state machine for handling the TTI identifier.

Let us next consider more closely the acceptance process shown in FIG. 7. On the left side of FIG. 7, a TTI identifier is accepted. On the right side, the accepted TTI is monitored so as to effectively observe possible changes in the TTI. As was mentioned above, the eight-bit bytes of the TTI are saved one by one. Saying starts if the aforementioned state machine, which is used for searching for frame alignment, outputs a signal 71 indicating that frame alignment has been found. Such information may be given using the FRAME-_START signal and LOTF flag, for example. Having received the signal the state machine saves one frame, each TTI byte one by one, SAVE_1 to SAVE_16. It is obvious to one skilled in the art that advantageously the acceptance state machine also is arranged so as to have counters and flags to indicate correctness of signals. In this exemplary embodiment there is a Right flag which indicates that the TTI bytes form the correct bit pattern. In addition, this exemplary embodiment includes a Correct counter to count the number of identical TTI identifiers in the frames. The Right flag and Correct counter are set 72 to the appropriate states by setting the Right flag high and resetting the Correct counter before commencing to match the TTI identifiers in successive frames. Next, the process moves on to state NAC_1 to match the first TTI byte against the corresponding saved TTI byte. If their bit patterns match EQ, the Right flag is kept high, and the process moves on to match the next bytes. If the bit patterns of said bytes do not match Not_EQ, the Right flag is lowered, and the process moves on to the next state NAC_2. This goes on until the matching of the last byte NAC_16. If the last byte and last saved byte differ from each other or the Right flag has been reset 74 in some previous matching, the process returns to state SAVE_1 in which the first byte of the TTI in the next frame is saved for matching, whereafter a similar round is executed. If all the bytes examined match EQ the saved bytes and the value of the Correct counter is smaller than the predetermined value for accepting the TTI, the Correct counter is incremented by one and the process moves on to match the next TTI byte values against the saved byte values 73. The operation continues similar until the Correct counter value equals the predetermined value for accepting the TTI. Then in this exemplary embodiment the aforementioned LOTT flag is set to a state indicating acceptance of the TTI 75. In addition, the Wrong flag and Faulty counter, which in this state machine are the same as in the previously described frame alignment state machine, are reset.

In another advantageous embodiment the left side of FIG. 7 may be realized such that said saving states SAVE_1 to SAVE_16 are arranged so as to be executed in said matching states NAC_1 to NAC_16. Advantageously this is done in such a manner that the received bytes are matched against the corresponding bytes saved in memory. If a byte examined differs from the corresponding saved byte, the byte in the memory is replaced with the byte examined. Such an arrangement may speed up the operation of the equipment in some cases, such as one in which the TTI of the first received frame is erroneous and the TTI of the next frame is correct.

At the monitoring stage it is monitored at least that the bytes of said TTI remain unchanged. Advantageously it is taken into account that random errors may occur in the bit stream which are allowed for by setting a limit for the Faulty counter, which limit defines how many random errors are permitted. The payload in the received frames is utilized during the monitoring stage. In states AC_1 to AC_15 of the monitoring stage the received TTI bytes are matched against the corresponding saved bytes. If the bytes match EQ, the process moves on to the next matching. If the bytes differ Not_EQ, the Wrong flag is set. When byte 16 is matched against the byte saved and they match and the Wrong flag has not been set in an earlier matching, the process returns to state AC_1 and continues checking the TTI bytes of the next frame. If the byte examined in state AC_16 differs from the byte saved or the Wrong flag has been set as a result from an earlier matching and the value of the Faulty counter is smaller than the predetermined limit value, the process returns to monitoring state AC_1, at the same time incrementing the counter value by one and resetting the Wrong flag 77. If in a matching the bytes matched differ from each other and the value of the Faulty counter equals the predetermined limit value, it is considered in this exemplary embodiment that the TTI identifier has changed, whereby the process returns 78 to state SAVE_1 on the left side of FIG. 7. Advantageously the LOTT flag is set high to indicate loss of TTI acceptance. If the matching in state AC 16 indicates that the last matched bytes are equal and the Wrong flag has not been set, the process moves on to state AC_1 to match the TTI bytes of the next frame, at the same time resetting the Faulty counter 76.

The acceptance state machine in which the TTI identifier is saved and accepted can be advantageously realized in accordance with the invention in such a manner that a memory element or elements are arranged in the hardware, in which memory element or elements the TTI bytes can be saved. According to an advantageous embodiment of the invention one 16×8-bit random access memory (RAM) element is arranged in the hardware, in which memory element all TTI bytes are saved one by one. The TTI bytes in the next frames are matched against the saved bytes already upon reception of the frames. It is obvious to a man skilled in the art that the same can be realized using several memory elements, in which case the TTI bytes in the frames are first saved in the memory elements, whereafter they are matched against each other. Advantageously the preferred embodiment of the invention, which only has one RAM element, saves some memory, which is particularly advantageous in a situation in which the solutions described are implemented using application specific integrated circuits (ASICs). Then it is possible to advantageously reduce the number of gates by even 16,000 to 50,000, depending on the technology used.

The state machines described above advantageously help prevent losing information contained in TTI identifiers should frame alignment be lost. In an advantageous embodiment of the invention, when frame alignment is lost, the aforementioned LOTF flag is raised to indicate loss of frame alignment, and the search for frame alignment is restarted in the first state machine. Advantageously a certain period of time has been arranged for finding the frame alignment such that if frame alignment is found during said period of time, the TTI acceptance process can be left undone in the second state machine. Advantageously the TTI used before the loss of frame alignment and saved in the memory element is used as the TTI identifier. If, however, frame alignment is not found during a predetermined period of time, the frame alignment acceptance operation is carried out as described above. In an advantageous embodiment of the invention the time for regaining frame alignment is 80 ms.

The solution according to the invention described above is particularly useful also in a situation where the TTI identifier is changed because of changes in cross-connections. In that case the arrangement according to the invention quickly detects the new address information and acts accordingly.

It is obvious to one skilled in the art that the above is not limited to apply to just one SDH system level, but what is specified above is applicable to all SDH system levels in a corresponding manner.

It is furthermore obvious to one skilled in the art that the structure of the TTI identifier described above may vary so that the invention can be adapted so as to be applicable in conjunction with other kinds of TTI identifier structure as well.

The term state machine means here generically an arrangement by means of which the functions described above can be realized.

The arrangement according to the invention is not limited to be applied only in arrangements according to the SDH system, but it can be applied to other systems as well, such as the Synchronous Optical Network (SONET), for example, within the scope of the inventional idea defined by the claims attached hereto.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method for determining frame alignment and accepting and monitoring address information bytes contained in frames in a synchronous digital hierarchy or synchronous optical network system, comprising the steps of:
   finding a frame alignment using a frame alignment signal;
   monitoring the frame alignment after the frame alignment is found;
   reading at least one address information byte from a frame after the frame alignment is found;
   saving the at least one address information byte; and
   maintaining the saved at least one address information byte for a predetermined time after loss of the frame alignment is detected.

2. The method of claim 1, further comprising the step of reading a second address information byte from a subsequent frame after the frame alignment is found.

3. The method of claim 2, further comprising the step of accepting the second address information byte after finding matched address information bytes from the frame and the subsequent frame.

4. The method of claim 2, further comprising the step of comparing address information bytes of a plurality of frames following the subsequent frame with the saved address information byte.

5. The method of claim 4, further comprising the step of accepting one of the address information bytes from the plurality of frames following the subsequent frame when the one of the address information bytes and a successive one of the address information bytes of the plurality of frames matches, with a predetermined accuracy, the saved address information byte.

6. The method of claim 5, further comprising the step of monitoring address information bytes of received frames after said step of accepting.

7. The method of claim 6, wherein said step of monitoring address information bytes further comprises using a counter to count the number of changes between the address information bytes of received frames and the saved address information byte, and determining a change in the saved address information bytes only when the number of changes counted by the counter exceeds a predetermined number of allowable random changes.

8. The method of claim 1, further comprising the step of allowing a predetermined number of changes in the frame alignment signal.

9. The method of claim 1, wherein the predetermined time is 80 ms.

10. The method of claim 1, wherein said step of saving comprises saving the at least one address information byte from a first frame after the frame alignment is found.

11. The method of claim 1, wherein the address information byte comprises a trail trace identifier.

12. An arrangement for determining a frame alignment and accepting and monitoring address information contained in frames in a synchronous digital hierarchy or synchronous optical network system, comprising:
 means for finding a frame alignment using a frame alignment signal;
 means for monitoring a correctness of the frame alignment after the frame alignment is found;
 means for reading at least one address information byte from a frame after the frame alignment is found;
 means for saving the at least one address information byte; and
 means for maintaining the saved at least one address information byte for a predetermined time after a loss of the frame alignment is detected.

13. The arrangement of claim 12, further comprising means for reading a second address information byte from a subsequent frame after the frame alignment is found.

14. The arrangement of claim 13, further comprising means for accepting the address information after finding matched address information bytes from the frame and the subsequent frame.

15. The arrangement of claim 12, wherein said arrangement comprises at least one state machine.

16. The arrangement of claim 12, wherein said arrangement comprises two state machines.

17. The arrangement of claim 12, wherein said means for saving comprises a memory element, said at least one address information byte being arranged and dimensioned for being saved in said memory element.

18. The arrangement of claim 12, wherein said means for saving comprises a 16×8 bit RAM memory, said at least one address information byte being arranged and dimensioned for being saved in said 16×8 bit RAM memory.

19. The arrangement of claim 12, wherein said means for saving comprises means for saving said at least one address information byte from a frame received after the frame alignment is found.

20. The arrangement of claim 12, wherein said at least one address information byte comprises a trail trace identifier.

* * * * *